Figure 7:
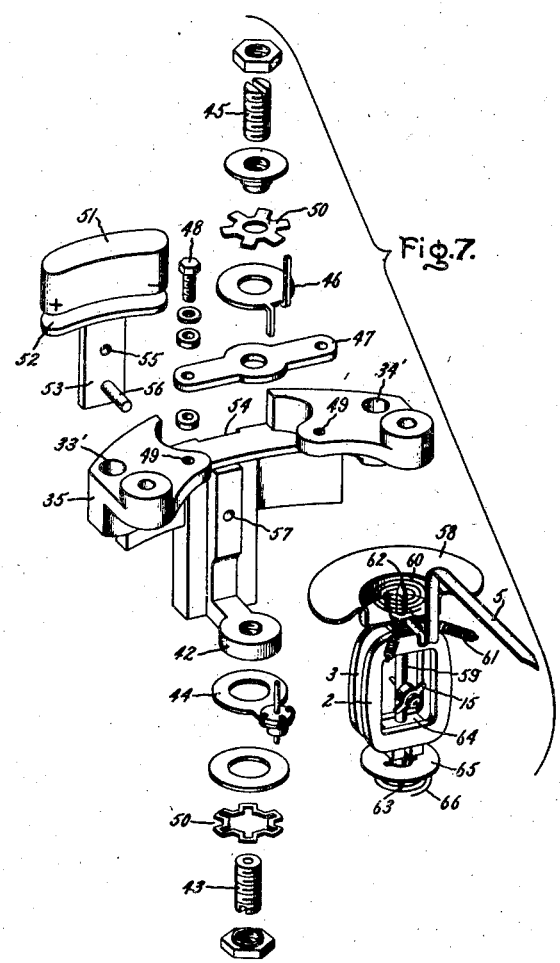

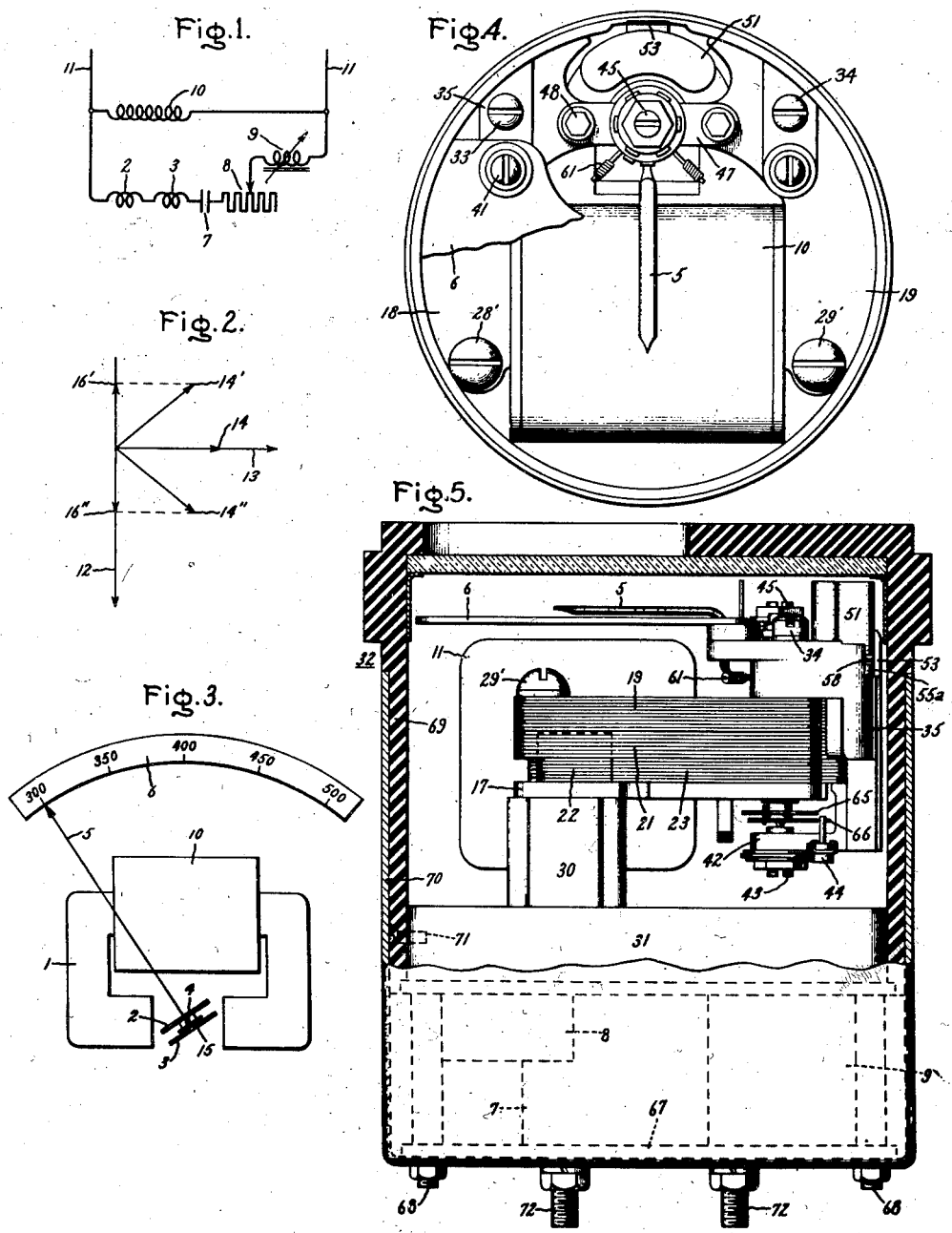

Oct. 19, 1948.  A. G. STIMSON  2,451,886
ELECTRICAL MEASURING INSTRUMENT
Original Filed June 9, 1944  3 Sheets-Sheet 2
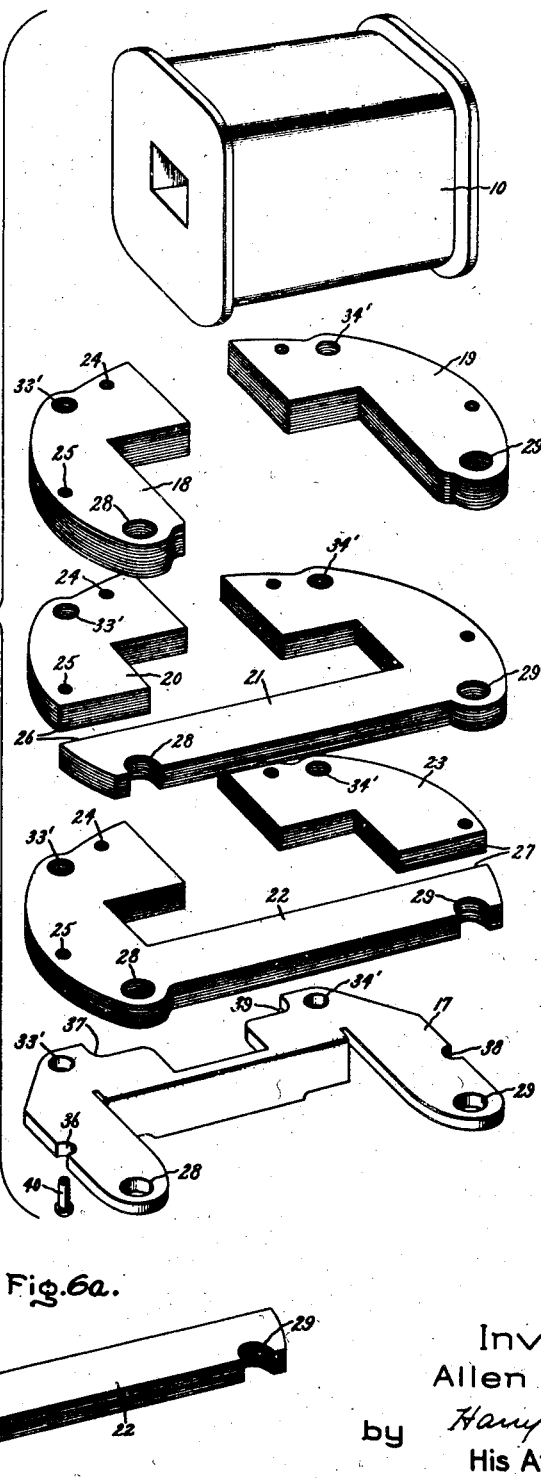
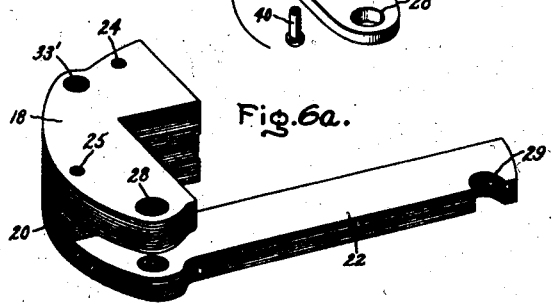
Inventor:
Allen G. Stimson,
by  Harry E. Dunham
His Attorney.

Patented Oct. 19, 1948

2,451,886

UNITED STATES PATENT OFFICE 2,451,886

ELECTRICAL MEASURING INSTRUMENT

Allen G. Stimson, Lynnfield, Mass., assignor to General Electric Company, a corporation of New York Original application June 9, 1944, Serial No. 539,546. Divided and this application April 13, 1945, Serial No. 588,196

5 Claims. (Cl. 171—95)

This application is a division of application Serial No. 539,546 filed June 9, 1944 (now Patent No. 2,411,010).

My invention relates to electrical measuring instruments and more particularly to miniature instruments for measuring frequency, although certain features of the invention are applicable to measuring instruments generally. An important object of my invention is to provide a compact, rugged, lightweight measuring instrument of good accuracy which is easy to assemble. The instruments to be described were designed for use on aircraft where it is especially desirable that instruments be small in size and light in weight. The features of my invention which are believed to be novel and patentable will be pointed out in the claims appended hereto.

For a better understanding of my invention, reference is made in the following description to the accompanying drawings in which Fig. 1 represents an improved circuit arrangement for a frequency meter embodying my invention; Fig. 2 is a vector diagram explanatory of the theory of operation of the frequency meter of my invention; Fig. 3 is a diagrammatic representation of a frequency meter embodying my invention; Fig. 4 represents a plan view and Fig. 5 a side view of a measuring instrument embodying my invention, the latter view showing a portion of a casing for the instrument; Fig. 6 is an exploded view of the coil, laminated field core, and supporting plate used in my invention; Fig. 6a shows one half of the field core assembled; Fig. 7 represents an exploded view of the armature assembly and supporting structure used in the frequency meter of my invention.

First, I will explain the theory of operation of my frequency meter in connection with Figs. 1, 2, and 3. The instrument has a stationary U-shaped field core 1 energized by a voltage coil and has a moving armature winding split into two coaxial coils 2 and 3 mounted on either side of the armature shaft 4 and a pointer 5 cooperating with a scale 6. The connections for measuring frequency are as represented in Fig. 1 where it is seen that the armature coils are connected in series and, except for the split arrangement to balance the coil assembly with respect to the armature shaft, might be considered as a single coil, since they are connected in boosting relation. The armature circuit includes a condenser 7, a variable resistance 8, and a variable reactance 9. The armature circuit thus comprised is connected in parallel with the field coil 10 across the source 11, the frequency of which is to be measured. For the purpose of representing a practical example, it will be assumed that the normal frequency of the source of supply is 400 cycles and that the scale range of the frequency meter is from 350 to 450 cycles.

The field coil 10 is of high reactance and its current represented by vector 12, Fig. 2, lags approximately 90 degrees behind the applied voltage represented by vector 13. The armature circuit is tuned and the phase angle of its current varies with the frequency. At approximately rated frequency of 400 cycles the armature circuit is preferably tuned for resonance so that its current represented by vector 14 is in phase with the voltage 13 at this time. Since 14 is 90 degrees out of phase with the field current 12, no torque due to current flow will be present at this time. The armature, however, is provided with a tiny magnetic vane 15 positioned with its magnetic axis at right angles to the axis of the armature coils, which vane is attracted by the flux across the armature air gap and positions the armature so that its coil axis is at right angles to the field flux axis across the gap under these conditions, and at this time the pointer is positioned to read near the center of the scale at the 400 cycle graduation. Now when the frequency goes below 400 cycles, the armature current will lead the voltage 13 as represented by vector 14', and a down-scale instrument torque represented by vector 16' will exist, producing a down-scale deflection. At frequencies above 400 cycles the armature current will lag the voltage 13 as represented by vector 14'', and an up-scale torque represented by vector 16'' will move the pointer up-scale from center. The magnitude of this up-scale and down-scale torque may be increased for a given armature current by increasing the values of capacitance and reactance in the armature circuit in comparison to the resistance, and the scale distribution changed accordingly. When the details of the armature assembly are described, it will be pointed out that the torque of the magnetic vane 15, which opposes the up-scale and down-scale instrument torques described, is also adjustable. The center restoring torque furnished by vane 15 varies with the voltage and makes the frequency meter substantially independent of voltage variations.

It is desirable that the armature current be kept at a low value and that the physical dimensions of the circuit elements 7, 8 and 9 be small and light in weight. After the initial calibration adjustments these circuit elements have fixed values. Without intending to limit my invention but to give a practicable set of values for the different circuit elements and assuring a 110 volt supply, I may use a coil at 10 having 1800 turns of 0.008 inch copper wire, .425 henrys, and 56 ohms resistance. The two armature coils may have 600 turns each of copper wire, the inductance 9 may have 5 henrys, and the capacitance at 7 may be a .03 microfarad condenser. The resistance of the armature circuit is of the order of 11,500 ohms. Under these conditions the field current will be of the order of 120 milliamperes and the armature current of the order of 10 milliamperes at rated voltage and frequency and with the aid of features to be described hereinafter, the entire instrument and circuit devices may be housed in a cylindrical casing having outside dimensions 2¼ inches in diameter and 3 inches in length. I desire to point out at this point that the instrument above described may be used as a position indicator by maintaining the voltage and frequency constant and varying the tuning of the armature circuit as by varying the reactance 9, for example.

Field structure

The laminated magnetic field core 1 is designed for minimum weight for a given iron loss, to facilitate assembly in a prewound coil and to reduce the space requirements of the assembled instrument. The core with its coil 10 and coil supporting plate 17 is shown disassembled in Fig. 6. The core comprises six stacks of laminations 18 to 23 inclusive. The stacks 21 and 22 are similar and may be stamped with the same die, and include pole piece sections integral at one end with the yoke or coil enclosed parts which are the longer leg portions thereof and which are assembled side by side. The stack sections 18, 20 and 22 are assembled as one group or unit as shown in Fig. 6a, and comprises one pole piece and one half the yoke, part 20 being between parts 18 and 22 and these parts riveted together by rivets that pass through the aligned rivet holes 24 and 25, the same rivet passing through the holes which are numbered alike in Fig. 6.

Core parts 19, 21, and 23 are assembled as a group with part 21 between 19 and 23 and riveted together to form the other pole piece and one half of the yoke. The non-polar ends of the two half yoke portions are then slid through the coil 10 from opposite ends, part 21 above and flat against part 22, until the facing surfaces at 26, Fig. 6, abut and the facing surfaces 27 abut, and the bolt openings numbered 28 are aligned and those numbered 29 are aligned. Bolts 28' and 29', Fig. 4, are then passed through the openings 28 and 29 respectively, and the corresponding numbered openings in the plate 17. The assembled core structure with its supporting plate 17 is then clamped together and against the upper flat surfaces (see Figs. 4 and 5) of pedestals 30 rising from a circular insulating support and wall 31 adapted to fit into a cylindrical casing 32 as best shown in Fig. 5. The pole piece parts of the assembled core laminations are also clamped to the supporting plate 17 by screws 33 and 34 which also clamp the support 35 for the armature assembly to the upper pole piece surface of the field core as shown in Figs. 4 and 5. The openings for the screws 33 and 34 are numbered 33' and 34' respectively. The supporting plate 17 has peripheral recesses at 36, 37, 38 and 39 positioned to receive the large heads of the rivets 40 (see Fig. 6) which are used in the holes 24, 25, etc. to rivet the laminations together. This facilitates quick assembly and aids in a rigid construction.

The split core arrangement facilitates replacement and repair of the coil and low-cost assembly of laminations, since each stack can be assembled and each half of the split core assembled before the coil is added.

It will be evident that the generally U-shaped field core described above has its laminations parallel with the plane of the U and is appreciably thicker and of larger cross section in the pole piece portions than in the yoke portions by reason of the pole piece parts 18 and 19, Fig. 6, which lie entirely above the plane of the remainder of the core in a direction at right angles to the plane of the laminations. The thickness of the pole piece portions of the core is increased with respect to the yoke portion of the core by the depth of these laminated pole piece stacks 18 and 19. One advantage of this is that I can operate the yoke portion of the core at a higher flux density than would be advisable for the pole piece portions and thus save material in the yoke section, and correspondingly reduce the inner and outer diameters of the coil 10 and the volume and weight of copper used therein for a given number of ampere turns and core loss. At 400 cycles for which the frequency meter is intended, the core loss is likely to be considerable unless certain precautions are taken. The construction permits of an acceptable core loss without sacrificing coil space. The laminations 21 and 22 which thread the coil 10 are preferably made of the order of only 0.005 inch in thickness which reduces the core loss in the higher flux density yoke part of the core, while the laminations of parts 18, 19, 20, 23 which operate at appreciably lower flux density and where there is greater need of structural rigidity, are preferably made of the order of 0.014 inch in thickness. It is to be noted that the laminations of the different core parts are not interleaved, as this would not permit of different thickness laminations in parts 20 and 21, for example, which lie in the same plane, nor would it permit of the ease of assembly and disassembly obtained. Instead of interleaving the laminations, certain core parts as a whole overlap and abut against other core parts at the junction of pole piece and yoke sections and are then clamped rigidly together.

To reduce further the core loss of the laminations, the rivets and screws used therethrough are kept as near the periphery of the core and out of the main flux path as is possible. As shown at 28 and 29 in laminated parts 21 and 22, respectively, the bolt openings are not closed by magnetic material. Where flux can pass outside of a bolt or rivet, it will be noted that the cross section of the magnetic material on the outside of all rivets and bolts is substantially the same. Hence, if any flux does go outside the bolts and rivets, that part of the flux will evidently stay outside all rivets and bolts around the entire periphery of the core, which would tend to induce currents therein of the same phase and magnitude but without a return circuit and as a consequence of the arrangement, negligible eddy current loss is occasioned by the presence of the bolts and rivets. For 400 cycle service I prefer to use laminations made of the high permeability nickel iron alloy known to the trade as Nicaloi.

In Fig. 5 the upper half of the nearly square yoke section is outlined by dotted lines, while the lower half is shown in full lines. It is to be noted that the pole piece portions of the core are offset from the center of the coil in one direction at right angles to the plane of the laminations towards the scale plate 6. This has the advantage that the scale plate may be placed lower down than would be the case if the coil were centered in the vertical direction with the pole piece, a viewed in Fig. 5, and requires less offset of th pointer 5 and saves a corresponding amount of space in the over-all height of the instrument as pictured in Fig. 5.

*The armature assembly and support*

All parts of the armature, its pivots, lead-in spirals, magnetic damper, armature stop, zero adjustment, and scale plate are supported by the support 35 (see Figs. 4, 5 and 7), and all of these parts are removable from the instrument as a unit by taking out the two screws 33 and 34. The support 35 is an integral die casting of non-magnet, corrosion-resisting material such as aluminum. The scale plate 6 is fastened thereto by two screws 41 (see Fig. 4). The support 35 has a lower forward horizontally extending part 42 which supports the lower bearing 43 and lower armature lead-in spiral supporting and adjusting element 44. The upper bearing 45 and upper lead-in spiral adjusting means 46 are supported by a strap 47 which is fastened to the lateral and forward extending top part of the support 35 by screws 48 entering into threaded openings 49. The two spiral adjusting means 44 and 46 are clamped in place coaxially with the axis of rotation of the armature under the compression of resilient slightly dish-shaped friction washers 50 which permits of their being rotatively adjusted readily but without danger of accidental movement from adjusted position by vibration.

Beneath the top bearing bridge strap 47 there is a central recess in the support 35 into which there loosely fit a kidney-shaped permanent magnet 51 and spaced return flux keeper 52 comprising the stationary part of a magnetic damper for the armature. The damping magnet parts 51 and 52 are secured near the upper end of a strap 53 which fits into an elongated vertical slot 54 in the rear side of support 35 as viewed in Fig. 7, and secured in place by a screw which enters through a hole 55. The damping magnet parts may thus be polarized as a unit and added last during assembly of the instrument parts and kept clean of magnetic particles. The strap 53 in the frequency meter also supports a removable armature stop 56. The stop 56 has a screw part threaded in the support 53 and a forward ceramic bushing part of insulating material which extends freely through the opening 57 in the support 35 and into the path of swing of the armature coils 2 and 3 to the rear of the armature as viewed in Fig. 7, and serves to stop their swing at suitable limits in both directions. The permanent magnet 51 is polarized as indicated in Fig. 7 so as to produce a flux across the air gap between it and the flux return part 52, and into this gap so as to be cut by the flux is inserted an aluminum damping vane 58 secured on the armature shaft 59.

*The armature*

It will be noted that the damping vane 58 is of an open or half cup shape between the point where it is fastened to shaft 59 and the flat outer peripheral portion, with the shaft inserted through the bottom of the cup and the cup opening upward. This cup shape provides added strength and rigidity to the damping vane and provides space and protection within the cup for the upper spiral lead-in wire 60 and the collar to which the pointer 5 and the balancing arms 61 are secured. The balancing arms 61 are at right angles to each other and 45 degrees from the pointer forward of and in the same plane with the damping cup member 58 where they are accessible for adjustment of their weights. This arrangement allows of balancing with two counterweights instead of three as is usual. It also allows of quick balancing with few operations as follows: With the instrument shaft held horizontal and with one balancing arm vertical, the armature is balanced with the other or horizontal balancing arm weight. Then the armature is rotated 90 degrees so that the other balancing arm is horizontal and its counterweight is shifted until a balance is obtained.

The instrument shaft 59 is a hollow bronze tube with the upper and lower pivots 62 and 63 pressed into its upper and lower ends. The magnetic vane 15 is secured to the shaft within the coils and is adjustable about its center support stud which goes through the shaft 59 so that the effective length of the vane and its torque in the field of the instrument may be varied. The 45 degree position of the vane shown in Fig. 7 gives approximately the correct restoring torque for the frequency meter described. When correctly adjusted it is permanently secured in place.

The armature coils 2 and 3 are shell-less and are held to the shaft by two flat-surfaced bushings 64 of insulating material fitting against the inner surfaces of the coils and to which the coils are secured at top and bottom by cement and lashings. The armature coils are wound with formex wire with the turns cemented together into a solid mass and are sufficiently stiff to provide their own support without using a shell or other coil form support. This gives an exceptionally high ratio of useful armature torque to armature weight and space. On the shaft below the coils there may be a washer 65 of mica to protect and insulate the lower lead-in spiral 66. The lead-in spirals of the frequency meter are adjusted to have minimum torque.

In order to give a better idea of dimensions, it may be stated that the total length of the armature coils is $\tfrac{7}{8}$ inch, with other dimensions in the proportions pictured in the exploded view of Fig. 7. When the parts shown in Fig. 7 are assembled, the total height of the assembly is approximately 1¼ inches. This assembly together with the scale plate which is omitted in Fig. 7 may be removed as a unit from the pole piece assembly by removing the two dowel screws 33 and 34, Fig. 4, and when this assembly is in place in the field and the dowel screws are tightened, the armature coils are correctly positioned in the field air gap.

The circuit elements of the frequency meter comprising the condenser 7, the resistance 8, and the reactance 9 are housed in the same casing 32 (see Fig. 5) with the instrument and are preferably mounted on the rear wall of the insulating partition base 31 which supports the instrument as indicated. The supporting enclosure for the condenser 7 may be held between the partition 31 and a cross plate indicated at 67 by bolts 68. The casing 32 may comprise two telescoping cylindrical parts 69 and 70 both secured to the base partition 31 of the instrument. Casing part 70 which is the outer rear telescoping part is held in place by nuts on bolts 68. Casing part 69 is held in place by screws, one of which is shown at 71, and which are accessible when the casing part 70 is removed. 72 represents the electrical terminals of the instrument. Frequency meters such as described are now being built for use on airplanes, enclosed in cylindrical casings less than three inches in total length and about 2¼ inches in diameter.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In an electrical measuring instrument, a laminated field core of generally U shape with the laminations parallel with the plane of the U and having a yoke portion and pole piece portions at either end of the yoke portion, an energizing coil on the yoke portion, the pole piece portions of the core being thicker than the yoke portion in a direction at right angles to the plane of the laminations, and having the center of the pole piece portions offset from the center of the yoke portion in one direction at right angles to the plane of the laminations.

2. In an electrical measuring instrument, a laminated magnetic core of generally U-shape having a yoke and two pole pieces at opposite ends of the yoke, said core being made up of six stacks of laminations two stacks comprising short pole piece sections, two stacks comprising long pole piece sections, and two stacks comprising yoke sections with integral pole piece sections at one end, one short and long pole piece section and one yoke and integral pole piece section being grouped to form one complete pole piece and half of the yoke and the remaining sections being grouped to form the other complete pole piece and one half of the yoke of the core, said two groups being assembled with the laminations of the yoke portions lying flat against each other as a continuous stack and with the nonpolar ends of the yokes of each group joining the long and short pole piece sections of the other group, and a prewound coil for said core mounted on the yoke portion during such assembly of the groups by inserting the nonpolar ends of the two yoke portions through the coil from opposite ends.

3. In an electrical measuring instrument, a U-shaped magnetic core having a yoke portion joining two pole piece portions and made up of six stacks of laminations riveted and bolted together with the laminations parallel with the plane of the U, said stacks comprising two long and two short pole piece sections and two split yoke sections with integral pole piece sections at one end, such yoke sections being formed of thinner laminations than the long and short pole piece sections and the pole piece portions of the core being of greater thickness than the yoke portion of the core by the depth of the short pole piece stacks in a direction at right angles to the plane of the laminations, one short and one long pole piece section and one yoke section with its integral pole piece section being riveted together as a unit to form one pole piece and one half of the yoke, and the remaining parts being riveted together as a unit to form the other pole piece and half of the yoke, aligned bolt holes in the long pole piece sections and in the yoke sections and bolts therefor for bolting said units together with the two half-yoke portions lying one above the other and with the nonpolar end of the yoke portion of one unit joining the long and short pole piece sections of the other unit and vice versa in overlapping and abutting relation respectively.

4. A compact alternating current electrical measuring instrument comprising a U-shaped laminated magnetic core having pole piece portions separated by an armature air gap and a yoke portion joining the pole piece portions, an energizing coil on the yoke portion, an armature pivoted between the pole pieces on an axis at right angles to the plane of the core, a scale plate extending parallel with the plane of the core closely adjacent the coil and a pointer moved by said armature over the scale plate, the pole piece portions of said core comprising laminations of appreciably greater depth and correspondingly greater cross-sectional area than the yoke portion of said core, and such greater depth portion being offset from the plane of the yoke portion of the core toward the scale plate.

5. In an electrical measuring instrument a unitary armature assembly comprising a casting having an upright portion, a lower forward extension, a lower bearing supported in said extension, upper lateral and forward extensions from said casting, a scale plate supported by said lateral extensions, bolt openings in said lateral extensions for removably securing said assembly in an instrument, a recess between said upper lateral extensions, a permanent damping magnet positioned within said recess and removably secured to said casting, a bridge secured across the forward portion of said recess, an upper bearing supported centrally of said bridge, a coil type of instrument armature having shaft means pivoted in said bearings, a sector-shaped damping vane secured on said armature shaft means and extending to the rear beneath said bridge and cooperating with said damping magnet, said damping vane being secured to said shaft means through an open front cup-shaped inner portion of the vane providing rigidity thereto, a pointer and balancing arm assembly secured to said shaft means within said cup and extending forward from the shaft means with the balancing arms at right angles to each other equally distant from the pointer, and an armature stop extending forward from the central portion of said casting and cooperating with said armature.

ALLEN G. STIMSON.

REFERENCES CITED

The following references are of record in the file of this patent:

UNITED STATES PATENTS

| Number | Name | Date |
|---|---|---|
| 1,648,705 | Wagner | Nov. 8, 1927 |
| 1,976,498 | Hoare et al. | Oct. 9, 1934 |
| 2,245,039 | Lilja | June 10, 1941 |

FOREIGN PATENTS

| Number | Country | Date |
|---|---|---|
| 17,043 | Great Britain | 1909 |